(12) United States Patent
Schneider et al.

(10) Patent No.: US 10,384,715 B2
(45) Date of Patent: Aug. 20, 2019

(54) METHOD FOR PROVIDING ASSISTANCE TO A DRIVER OF A VEHICLE AND DRIVING ASSISTANCE SYSTEM

(71) Applicant: Robert Bosch GmbH, Stuttgart (DE)

(72) Inventors: Marcus Schneider, Ludwigsburg (DE); Axel Stamm, Stuttgart (DE); Michael Helmle, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/529,439

(22) PCT Filed: Dec. 15, 2015

(86) PCT No.: PCT/EP2015/079865
§ 371 (c)(1),
(2) Date: May 24, 2017

(87) PCT Pub. No.: WO2016/110382
PCT Pub. Date: Jul. 14, 2016

(65) Prior Publication Data
US 2017/0327149 A1 Nov. 16, 2017

(30) Foreign Application Priority Data
Jan. 9, 2015 (DE) .................... 10 2015 200 171

(51) Int. Cl.
| | | |
|---|---|---|
| *B60T 7/22* | (2006.01) | |
| *B62D 1/28* | (2006.01) | |
| *B62D 5/00* | (2006.01) | |
| *B60W 10/18* | (2012.01) | |
| *B60W 30/10* | (2006.01) | |

(Continued)

(52) U.S. Cl.
CPC ............. *B62D 15/025* (2013.01); *B60T 7/22* (2013.01); *B60W 10/18* (2013.01); *B60W 30/10* (2013.01);

(Continued)

(58) Field of Classification Search
CPC ........ B62D 15/025; B62D 1/286; B62D 1/28; B62D 5/008; B60W 30/143; B60W 10/18;

(Continued)

(56) References Cited

U.S. PATENT DOCUMENTS 5,709,281 A * 1/1998 Sherwin ............... B62D 5/0466
180/169
6,178,365 B1 1/2001 Kawagoe et al.
(Continued)

FOREIGN PATENT DOCUMENTS

DE 10144797 A1 3/2003
DE 102007020280 A1 11/2008
(Continued)

OTHER PUBLICATIONS

International Search Report dated Feb. 18, 2016, of the corresponding International Application PCT/EP2015/079865 filed Dec. 15, 2015.

*Primary Examiner* — Russell Frejd
(74) *Attorney, Agent, or Firm* — Norton Rose Fulbright US LLP; Gerard Messina

(57) ABSTRACT

A method for providing assistance to a driver of a vehicle, the vehicle including a driver assistance system that enables at least temporary autonomous driving, and that, after the termination of the autonomous driving, requests the driver to take over at least the lateral guidance of the vehicle via a signal. It is further provided that the steering of the vehicle is stiffened for a specified time span after the request to take over the lateral guidance. A computer program and a device that are set up to carry out the method, are also described.

8 Claims, 3 Drawing Sheets

(51) Int. Cl.
*B60W 30/12* (2006.01)
*B60W 30/14* (2006.01)
*B60W 50/08* (2012.01)
*B62D 15/02* (2006.01)

(52) U.S. Cl.
CPC .......... *B60W 30/12* (2013.01); *B60W 30/143* (2013.01); *B60W 50/082* (2013.01); *B62D 1/28* (2013.01); *B62D 1/286* (2013.01); *B62D 5/008* (2013.01); *B60T 2201/022* (2013.01); *B60T 2201/087* (2013.01); *B60W 2540/04* (2013.01); *B60W 2540/18* (2013.01); *B60W 2710/202* (2013.01)

(58) Field of Classification Search
CPC .... B60W 30/10; B60W 30/12; B60W 50/082; B60W 2540/18; B60W 2710/202; B60W 2540/04; B60T 7/22; B60T 2201/087; B60T 2201/022
See application file for complete search history.

(56) References Cited

U.S. PATENT DOCUMENTS

| | | | | |
|---|---|---|---|---|
| 6,895,318 B1* | 5/2005 | Barton | ................ | B60T 8/1755 180/204 |
| 2005/0109556 A1* | 5/2005 | Kubota | ............... | B62D 5/0463 180/446 |
| 2006/0041355 A1* | 2/2006 | Blundell | .............. | B62D 5/0472 701/41 |
| 2007/0124051 A1* | 5/2007 | Fujita | ................. | B60G 17/0162 701/70 |
| 2013/0060414 A1* | 3/2013 | Lee | ........................ | B62D 1/286 701/23 |
| 2013/0253767 A1* | 9/2013 | Lee | ........................ | B60W 50/04 701/42 |
| 2014/0257628 A1* | 9/2014 | Lee | ...................... | B62D 5/0481 701/34.4 |
| 2015/0158524 A1* | 6/2015 | Lee | ..................... | B62D 15/025 701/41 |
| 2015/0187224 A1* | 7/2015 | Moncrief | .............. | G09B 9/052 434/30 |
| 2017/0158227 A1* | 6/2017 | Katzourakis | .......... | B62D 6/008 |

FOREIGN PATENT DOCUMENTS

| | | |
|---|---|---|
| DE | 102007029909 A1 | 1/2009 |
| DE | 202010001368 U1 | 9/2010 |
| DE | 102010031672 A1 | 1/2012 |
| DE | 102011085167 A1 | 4/2013 |
| DE | 102012022387 B3 | 2/2014 |
| EP | 2418142 A1 | 2/2012 |
| WO | 2004103798 A1 | 12/2004 |

* cited by examiner

METHOD FOR PROVIDING ASSISTANCE TO A DRIVER OF A VEHICLE AND DRIVING ASSISTANCE SYSTEM

The present invention relates to a method for providing assistance to a driver of a vehicle, the vehicle having a driver assistance system that enables at least temporary autonomous driving, and that after the termination of the autonomous driving requests the driver, via a signal, to take over at least the lateral guiding of the vehicle. Further aspects of the present invention relate to a computer program that executes the method, and to a driver assistance system.

BACKGROUND INFORMATION

In modern vehicles, driver assistance systems are used to support the driver of a vehicle in the execution of various driving maneuvers. Such driving maneuvers include for example entering and/or leaving a parking space with the vehicle, entering and/or leaving a garage, or guiding the vehicle through narrow places such as entries or construction sites. In conventional systems, semiautomatic, also called semiautonomous, driver assistance systems are systems in which the driver assistance system takes over either the longitudinal guidance of the vehicle, i.e., the acceleration and braking of the vehicle, or the lateral guidance of the vehicle, i.e., the steering of the vehicle. In fully automatic, also called fully autonomous, driver assistance systems, the driver assistance system takes over both the longitudinal and the lateral guidance of the vehicle. In this case, the driver is left with only a checking and monitoring function.

German Patent Application No. DE 20 2010 001 368 A1 describes a method for supporting a driver of a vehicle during a driving maneuver. The driving maneuver can be for example parking in a parking space. In order to support the driver, an automatic controlling is provided that includes both automatic steering and automatic longitudinal guidance of the vehicle. In addition, it is provided that systems used for the automatic controlling are monitored and, if the presence of a disturbance is determined, the automatic controlling is terminated. The terminating of the automatic controlling is indicated to the driver, for example by acoustic, optical, or haptic means.

German Patent Application No. DE 10 2010 031 672 A1 describes a further method for supporting a driver of a motor vehicle. Here, it is provided to guide the vehicle automatically along a previously calculated trajectory, and, after termination of the driving maneuver, to return control of the vehicle to the driver. After control is handed over to the driver, the driver is given instructions as to the direction in which he is to steer, in order for example to avoid a collision with oncoming traffic when leaving a parking space. For example, for this purpose a torque can be applied to the steering wheel that has the result that the driver moves the steering wheel in the correct direction.

In the conventional solutions, there is the problem that if the driver intervenes too late in the steering, the driver may overreact, and may inadvertently rotate the steering wheel when grasping it. This is also known as oversteering. This is problematic in particular when the driver is untrained or if the request to take over the steering, or the lateral guidance, takes place in a surprising manner.

SUMMARY

In accordance with the present invention, an example method for providing assistance to a driver of a vehicle is provided, the vehicle including a driver assistance system that enables at least temporary autonomous driving and that after the termination of the autonomous driving requests the driver to take over the lateral guidance of the vehicle via a signal. It is further provided that the steering of the vehicle is made stiffer for a specified time span after the request to take over the lateral guidance.

The driver assistance system can, for example, be a fully automatic or fully autonomous driver assistance system in which the driver assistance system takes over both longitudinal and lateral guidance of the vehicle. Here, the term "longitudinal guidance" is understood as the acceleration and braking of the vehicle, and "lateral guidance" designates the steering of the vehicle. Such a fully automatic or fully autonomous driver assistance system carries out a driving maneuver in which the vehicle is guided along a trajectory completely autonomously, i.e., automatically. The driver is then left with only a monitoring function. Here, the term "trajectory" designates the curve of the roadway over which the vehicle moves during the execution of the driving maneuver.

Alternatively, the driver assistance system can be a semiautomatic, or semiautonomous, driver assistance system in which the driver assistance system takes over either the longitudinal guidance of the vehicle or the lateral guidance of the vehicle. Correspondingly, depending on the realization of the semiautomatic driver assistance system, the driver takes over the lateral guidance or the longitudinal guidance of the vehicle, while at the same time performing a monitoring function.

Depending on the embodiment of the driver assistance system, this system can carry out the entire trip of the vehicle fully automatically or fully autonomously, so that the driver can be regarded as a passenger in his own vehicle. In addition, it is possible that the driver assistance system supports the driver only in particular driving maneuvers, for example when entering or leaving a parking space, when entering or leaving a garage, when passing through a narrow area, driving through a construction site, and the like. A further example of such a driving maneuver is driving around an obstacle that is difficult for the driver to detect, for example because it is so close to the ground that it is below the range of view of the external mirrors.

Below, the term "autonomous driver assistance system" or "autonomously carried out driving maneuver" is to be understood as meaning both a driving maneuver carried out semiautonomously, or semiautomatically, in which the driver still takes over longitudinal guidance of the vehicle, and also a driving maneuver carried out fully automatically or fully autonomously, in which the driver performs only a monitoring function.

Transfer to the driver of at least the lateral guidance of the vehicle is required if either the autonomously executed driving maneuver is terminated, for example after the vehicle has exited a parking space, or when, due to a disturbance, the autonomous driving maneuver can no longer be continued. Such a disturbance can be for example a defect of the driver assistance system. In addition, the execution of an autonomous driving maneuver can be disturbed because, for example, the reception of a satellite navigation system, such as GPS, is disturbed, or markings necessary to carry out the autonomous driving maneuver, such as roadway markings, are not available, for example because of construction work.

In particular in a driver assistance system that not only autonomously carries out individual limited driving maneuvers, such as for example leaving a parking space, but rather autonomously guides the vehicle during the entire trip or a significant part thereof, it is preferable to notify the driver of the taking over of at least the lateral guidance timely enough that the driver is given a certain amount of time until he has to take over the steering. Thus, for example it is possible to monitor the position of the vehicle via a satellite navigation system and to request the driver to take over the lateral guidance before reaching a problem location, such as for example a construction site where roadway markings are missing or cannot be automatically evaluated. Here, the momentary speed of the vehicle can also be taken into account so that the request takes place timely enough that the driver has a specifiable period of time until taking over the steering. This takeover time can be for example in the range of 2 to 10 seconds, in particular 4 to 7 seconds.

The request to take over at least the lateral guidance of the vehicle can take place for example via acoustic or optical signals. In addition, haptic signals are possible; here it is preferred for example to set the driver's seat or the steering wheel into vibration, or to carry out a short braking intervention that causes a noticeable jerk in the vehicle.

The provision of the takeover time period lets the driver have an overview of the current traffic situation before having to take over the lateral guidance of the vehicle.

In addition, it is provided that after the request for taking over the lateral guidance the steering of the vehicle is made stiffer for a specified time span. This prevents the driver from inadvertently rotating the steering wheel when grasping it, also known as oversteering. This is a problem in particular when the driver is untrained, or if the driver is surprised by the request to take over the steering of the vehicle.

Without the provided stiffening of the steering, it is easily possible that when grasping the steering wheel the driver will rotate it slightly, for example by an angle of 15°. If the unintentional steering wheel rotation is maintained only over a short time, for example half a second, and if the vehicle is moving at low speed, as is standard for example when entering and/or leaving a parking space, for example 12 km/h, then, given a typical axle spacing of 2.5 m, a departure of the vehicle from its path of approximately 10 cm results. At the low speeds that are standard in particular when entering or leaving a parking space, this can perhaps be relatively uncritical with regard to risk, as long as the driver reacts quickly and corrects the steering rotation, but when entering or leaving a parking space precisely this degree of precision, in the centimeter range, is often critical.

In contrast, at a higher vehicle speed, for example a speed of 100 km/h, as is standard for example when traveling on rural roads or highways, such an unintentional steering rotation of for example 15° for half a second can already cause the vehicle to deviate by more than a meter. This could result in departure from the roadway, and possibly collision with a neighboring vehicle or structures at the edge of the road, thus resulting in an accident.

According to the present invention, unintentional rotation of the steering wheel, or unintentional oversteering, can be avoided by making the steering stiffer for a specified time span after the request for taking over the lateral guidance. Here, stiffening is understood as meaning that the rotation of the steering wheel is made more difficult, and/or that the effects of a steering rotation are reduced.

Preferably, the stiffening of the steering takes place in that a steering support is reduced within a specified time span.

Conventional devices are available for steering support, referred to as "power steering" or "servo-assisted steering." Here, when the driver rotates the steering wheel a steering torque is produced in the steering linkage. This torque is acquired by a sensor. In order to boost the steering torque applied by the driver, as a function of a specified gain factor a steering actuator is actuated that also applies a torque to the steering linkage. For example, the gain factor can be from 5 to 10, so that for example given a steering moment produced by the driver of for example 1.5 Nm and a gain factor of 10, a further torque of 15 Nm is exerted on the steering linkage by the steering actuator. For the temporary stiffening of the steering within the specified time span, this gain factor can be reduced to a lower value. This lower value can for example be a constant, such as a gain factor of 1, or can vary over the specified time span. For example, it is possible that at the beginning of the specified time span the gain factor assumes its lowest value, for example 1, and at the end of the specified time span it reaches its maximum value, for example 10.

In a further preferred specific embodiment, the steering is stiffened by applying a counter-torque that is opposed to a steering movement of the driver when the steering movement takes place within the specified time span. The counter-torque is produced by modifying the gain factor of a power steering or steering support within the specified time span, similar to the manner described above in connection with the reduction of a steering support. To apply the counter-torque, a gain factor having a value <0 is specified. For example, the gain factor is selected from the range −0.1 to −5, preferably the range −0.5 to −2. If for example the gain factor is set at −0.8, then if the driver produces a steering torque of 2.5 Nm a counter-torque of −2 Nm is produced. Again, with regard to the gain factor is possible to specify this factor as a constant, e.g. −0.8, or to vary it within the specified time span. Thus, it is for example possible to begin with the lowest value, for example −2, at the beginning of the specified time span, and to cause the gain factor to increase, so that at the end of the specified time span it assumes its largest value, for example −0.1.

In addition, it is possible to combine both approaches by specifying a negative gain factor at the beginning of the specified time span, and in the meantime, or up to the end of the specified time span, specifying a positive reduced gain factor. Thus, it is for example possible to set the gain factor to the value −0.8 at the beginning of the specified time span, the gain factor increasing in stepped fashion or in linear fashion over time, and assuming the value 10 at the end of the specified time span, when the standard steering support is again provided by the servo steering.

In addition, it is preferred if, for the stiffening of the steering within the specified time span, a steering ratio is modified, in particular reduced, so that steering wheel rotations result in smaller wheel steering angle rotations. Here, the steering ratio relates to the intermediate gear mechanism situated between the steering and the wheels, and designates the ratio between the steering wheel rotation and the amount of rotation of the front wheels of the vehicle. For example, it is possible that in the normal case the steering ratio is 14:1, while during the specified time span it is changed to a factor of 56:1. Given such a reduced steering ratio, an inadvertent steering wheel rotation of for example 15° would then be implemented only to a quarter of its extent, i.e. somewhat less than 0.27° instead of 1.07°. In this way, by changing the steering ratio the effect of the steering wheel rotation on the wheels is reduced. Again, it is possible to specify the factor for the modified steering ratio as a constant during the specified time span, or to make it variable over time.

The strength of the stiffening is preferably determined as a function of the driving speed of the vehicle, the stiffening increasing as the speed of the vehicle increases. If the stiffening is carried out via an intervention in the gain factor of a servo steering or steering support, then the speed-dependent stiffening can be realized by having the intervention in the gain factor take place more strongly the higher the speed of the vehicle is. If for example the steering ratio is reduced in order to stiffen the steering, then the steering ratio is reduced more greatly the greater the speed of the vehicle is.

Preferably, the stiffening of the steering of the vehicle takes place as a function of the steering direction, the stiffening being stronger in the case of steering in the direction of an obstacle or a lane boundary than in the case of steering in the direction of an open surface.

The driver assistance systems present in the vehicle rely on data about the surrounding environment of the vehicle in order to function. For this purpose, the vehicle is equipped with various sensors, such as distance sensors based on radar, lidar, or ultrasound. In addition, the vehicle can for example include camera systems that can recognize roadway markings. If these sensor systems determine for example that obstacles are present at a side of the vehicle, such as other vehicles, guide rails, or trees, while the other side is free of obstacles, then oversteering in the direction of such an obstacle would result in an accident, whereas oversteering in the opposite direction would not have consequences. In order to avoid unnecessary interventions, it is therefore preferable to carry out the stiffening of the steering only when the vehicle is thereby controlled in the direction of an obstacle. This can be realized for example by making no intervention in the gain factor of a servo steering, or intervening only to a reduced extent, if steering in the direction of an open surface is taking place. Likewise, given steering in the direction of an open surface, a reduction of the steering ratio can be omitted, or this intervention can be smaller.

In a specific embodiment of the method, the specified time span for stiffening the steering can begin together with the request for taking over the lateral guidance. Preferably, however, it is provided that the specified time span for stiffening the steering begins at the time at which the driver grasps the steering wheel of the vehicle, or that the specified time span begins at the time at which the driver begins to steer. The time at which the driver grasps the steering wheel can be determined for example using interior cameras, proximity sensors, or contact sensors on the steering wheel. For example, in particular capacitive or inductive proximity sensors are suitable for this purpose. Alternatively or in addition, the grasping of the steering wheel can be recognized by monitoring the steering torque. Here, changes in the steering torque, or an increase in the steering torque past a specified threshold, are indicators that the driver is grasping the steering wheel. The threshold for recognizing a steering torque can for example be defined as 1 Nm, and in addition an averaging can take place over a specified time span, for example 120 ms.

In a specific embodiment, the specified time span within which the steering is stiffened can specified as a constant selected for example from a range of 500 ms to 1500 ms. Preferably, the specified time span is selected as a function of the speed of the vehicle, a distance from an obstacle, a distance from a lane boundary, or a combination of a plurality of these parameters. In this way, for example an intervention in the steering can be smaller at lower speeds of the vehicle, at which only slight consequences are to be expected from an inadvertent oversteering. If a dangerous situation is present, for example if obstacles are detected at both sides of the vehicle, then, in contrast, the specified time span can be selected to be longer for safety reasons.

According to the present invention, in addition a computer program is provided according to which one of the methods described herein is carried out when the computer program is executed on a programmable computer device. The computer program can be for example a module for implementing a driver assistance system, or a subsystem thereof, in a vehicle, or can be an application for driver assistance functions, executable for example on a smartphone or tablet. The computer program can be stored on a machine-readable storage medium, such as a permanent or rewritable storage medium, or in allocation to a computer device, or on a removable CD-ROM, DVD, Blu-Ray disc, or USB stick. Additionally or alternatively, the computer program can be provided for downloading on a computer device such as a server, for example via a data network such as the Internet or via a communication connection such as a telephone line or a wireless connection.

Moreover, according to the present invention a device is provided for supporting a driver of a vehicle, the device including a control device that implements a driver assistance system that permits an at least temporarily autonomous driving of the vehicle. In addition, it is provided that the control device is set up to stiffen a steering of the vehicle for a specified time span.

For the stiffening of the steering, the control device is preferably connected to a control device that implements a servo steering, for example a steering control device.

Preferably, the device is designed and/or set up to carry out the methods described herein. Accordingly, features described in the context of the method hold correspondingly for the device, and, conversely, features described in the context of the device hold correspondingly for the method.

With the example method in accordance with the present invention, a driver of a vehicle is supported when he is requested to take over the lateral guidance of the vehicle after an automatically executed driving maneuver. In particular if the vehicle is a highly automated vehicle that carries out a trip entirely or at least to a large extent fully autonomously, so that the vehicle takes over both longitudinal and lateral guidance, it can happen that the driver takes over the steering only with a delay, and in doing so overreacts, which can result in oversteering. This oversteering by the driver is more probable the less attention the driver is paying to traffic. In particular at high speeds, for example more than 100 km/h, an inadvertent rotation of the steering wheel by 15° can already cause the vehicle to deviate by more than one meter, which in the worst case can result in an accident.

Through the method according to the present invention such oversteering is advantageously avoided by stiffening the steering for a specified time span after the request is made for the taking over of lateral guidance. As long as the steering is stiffened, it is more difficult for the driver to accidentally rotate the steering wheel. In addition, it is advantageously possible to mitigate the consequences of oversteering by reducing the steering ratio.

In developments of the example method in accordance with the present invention, the duration and the strength of the stiffening are made to be a function of whether a dangerous situation is present. Such a situation can be present for example at high speeds or when there are obstacles in the environment around the vehicle. In this way, unnecessary interventions in the driving characteristic of the vehicle are avoided in situations in which oversteering would not have consequences. As a result, the driver does not feel unnecessarily overridden by the driver assistance system of the vehicle.

Advantageously, in many cases no additional means, i.e., hardware in the vehicle, are required to realize the method in accordance with the present invention. The stiffening of the driving can take place through an intervention in an electrically supported steering system (EPS), also known as servo steering, that is already present. The recognition of potentially dangerous situations also does not require the provision of additional sensors, because these are required anyway for partly autonomous or fully autonomous driving and are typically already present in the vehicle. It is therefore possible to retroactively install the driver assistance system according to the present invention in a vehicle by installing suitable software, or with the aid of a retrofitting kit that includes for example sensors and a control device.

BRIEF DESCRIPTION OF THE DRAWINGS

Exemplary embodiments of the present invention are shown in the figures and are explained in more detail below.

DETAILED DESCRIPTION OF EXAMPLE EMBODIMENTS

Figure 1:
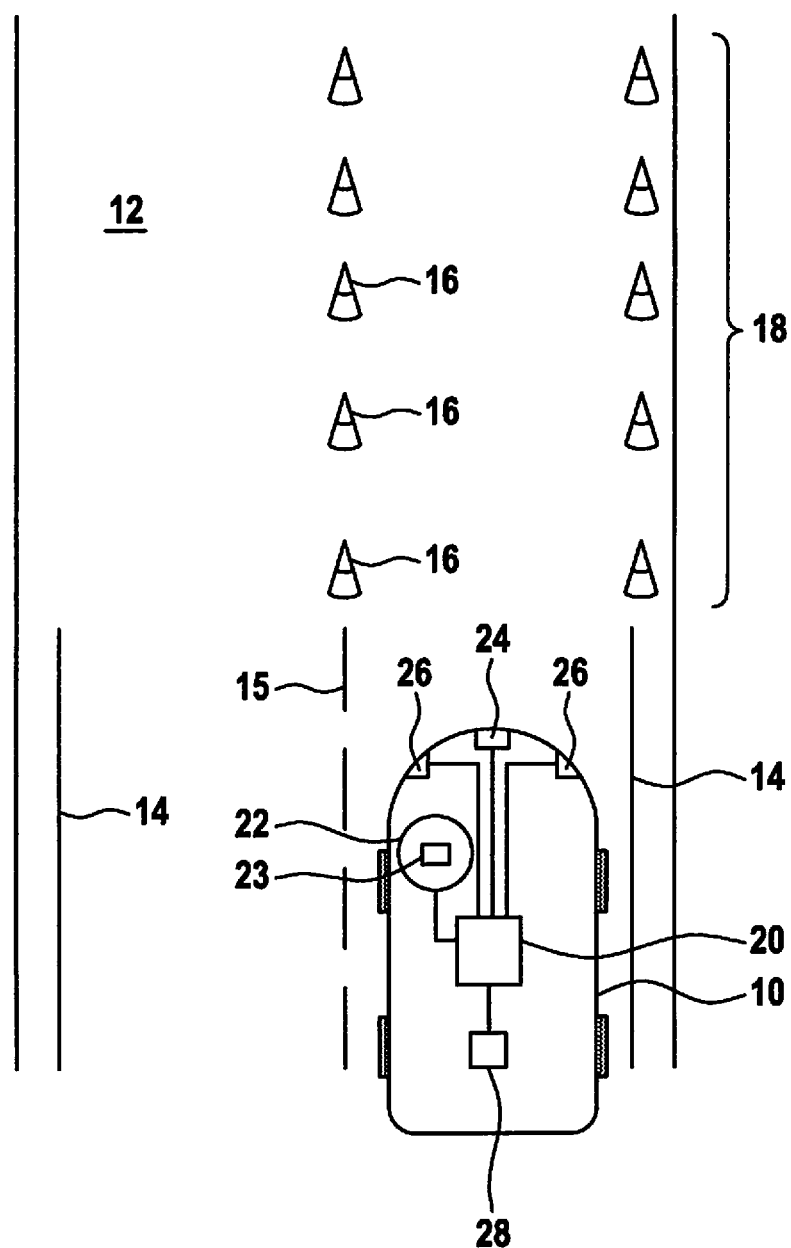
FIG. 1 shows a vehicle driving into a construction site area.

In the following description of exemplary embodiments of the present invention, identical or similar components have been designated with identical reference characters, and a repeated description of these components in individual cases is omitted. The Figures represent the subject matter of the present invention only schematically.

FIG. 1 shows a vehicle entering a construction site area.

FIG. 1 shows a vehicle 10 traveling on a street 12. On street 12 there are situated markings 14, 15. Roadway boundaries 14 limit the drivable area of street 12. Lane markings 15 divide street 12 into two lanes. Vehicle 10 is situated in the right lane.

Vehicle 10 includes a control device 20 that is connected to distance sensors 26 and a camera 24. In addition, control device 20 is set up to take over both the longitudinal guidance and the lateral guidance of vehicle 10, so that fully autonomous driving is enabled. The possibility of lateral guidance is indicated in FIG. 1 by a connection between control device 20 and a steering wheel 22 of vehicle 10. The vehicle further includes a GPS receiver 28 in order to provide satellite navigation data to control device 20.

For fully autonomous driving of vehicle 10, the environment surrounding vehicle 10 is monitored for obstacles using distance sensors 26. In addition, camera 24 acquires both lane boundary 14 and lane markings 15 on street 12, so that vehicle 10 can follow the right lane of street 12 without intervention by the driver. Vehicle 10 thus automatically follows the course of street 12, and the driver of vehicle 10 merely has to monitor the driving process.

In a construction site area 18 on street 12, however, neither roadway boundaries 14 nor lane markings 15 are available. Instead, in construction site area 18 the lane is identified by traffic cones 16.

In the situation shown in FIG. 1, the driver assistance system of vehicle 10 implemented by control device 20 must hand over at least the lateral guidance to the driver of vehicle 10, because the further course of the lane is no longer guaranteed by the acquisition of roadway boundaries 14 and lane markings 15 by camera 24. The necessity of taking over the lateral guidance is communicated to the driver via corresponding means, such as an acoustic or an optical signal.

In order to give the driver an adequately long takeover time within which, after the signal has been made to take over the lateral guidance, the driver can orient himself and gain an overview of the traffic situation, in the case of known construction site areas 18 the signal for this can be outputted already before reaching construction site area 18. For this purpose, the position of vehicle 10 is ascertained using GPS receiver 28 and, as the vehicle approaches construction site area 18, the time of the request to take over lateral guidance is given when, taking into account the speed of vehicle 10, vehicle 10 is for example 7 seconds away from construction site area 18.

When the driver of vehicle 10 grasps steering wheel 22, an inadvertent steering wheel rotation, or oversteering, may occur. It is then possible that vehicle 10 will depart from the lane, and will either move from the right lane into the region of the left lane, or will completely leave street 12, which could result in an accident. In order to avoid an unintentional steering wheel rotation or oversteering, according to the present invention it is provided to stiffen the steering of vehicle 10 temporarily for a specified time span.

For the stiffening of the steering, control device 20 can act on a steering support unit 23. Such a steering support 23, for example realized as a servo steering, acquires the torque, for example 1.5 Nm, applied to the steering linkage by the driver through rotation of steering wheel 22. Subsequently, as a function of a gain factor a steering actuator is actuated by steering support 23, and an additional steering torque is produced. If for example the gain factor is 10, then, in the example, for a steering torque of 1.5 Nm applied by the driver, an additional steering torque of 15 Nm is produced by the steering actuator. For the stiffening of the steering, the gain factor is set to a lower value, for example a value of 1, for a specified time span, for example 700 ms. Within the specified time span in which the steering is stiffened, the driver then has to exert a significantly larger steering torque than in the normal state. In this way, it is made more difficult for the driver to rotate the steering wheel, which prevents inadvertent rotation or oversteering. In further specific embodiments of the present invention, it is in addition possible, in order to stiffen the steering, to produce a counter-torque opposed to the steering torque applied by the driver, or to reduce the steering ratio between the deflection of the steering wheel and the resulting rotation of the front wheels of vehicle 10.

Figure 2:
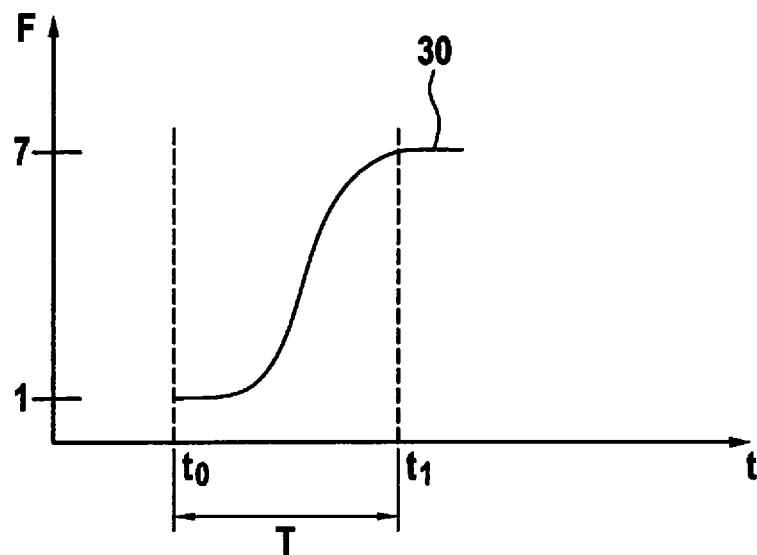
FIG. 2 shows the stiffening of the steering by reducing the steering support.

FIG. 2 shows the stiffening of the steering through the reduction of a steering support.

In FIG. 2, a diagram is shown that shows the gain factor of a steering support, in particular a servo steering, as a function of time. In FIG. 2, the temporal curve of gain factor F is identified with reference character 30.

In the depicted example, gain factor F is normally 7, and at time $t_0$, at which specified time span T begins, it is reduced to the factor 1. The specified time span T ends at time $t_1$, and here gain factor F again reaches its normal value of 7. Within specified time span T, gain factor F varies, increasing over time.

Figure 3:
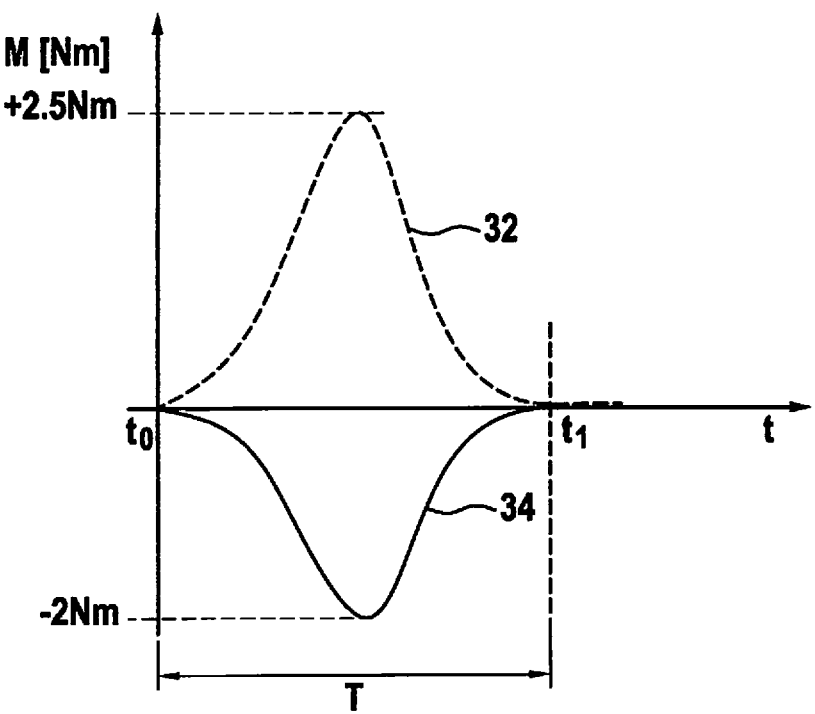
FIG. 3 shows the stiffening of the steering through the application of a counter-torque.

FIG. 3 shows the stiffening of the steering through the application of a counter-torque.

FIG. 3 shows the curve of a steering torque 32 applied by the driver, as well as of a counter-torque 32, over time t, torques M being indicated in units Nm. Here it is provided to set the gain factor of the steering support, or the servo steering, to a value of for example −0.8 within specified time span T. In this way it is achieved that an opposite counter-torque is produced corresponding to steering torque 32 applied by the driver. The counter-torque increases in its magnitude when the steering torque applied by the driver increases, and decreases when steering torque 32 applied by the driver decreases. Here, the maximum magnitude of −2 Nm of counter-torque 34 corresponds to the maximum value of steering torque 32 of 2.5 Nm for the case in which the gain factor is set at −0.8. In the example shown in FIG. 3, during specified time span T, which begins at time $t_0$ and ends at time $t_1$, the gain factor is held constant at the value −0.8. In further specific embodiments, however, it would be possible to select the gain factor to be variable, similar to the manner described with reference to FIG. 2.

Figure 4A:
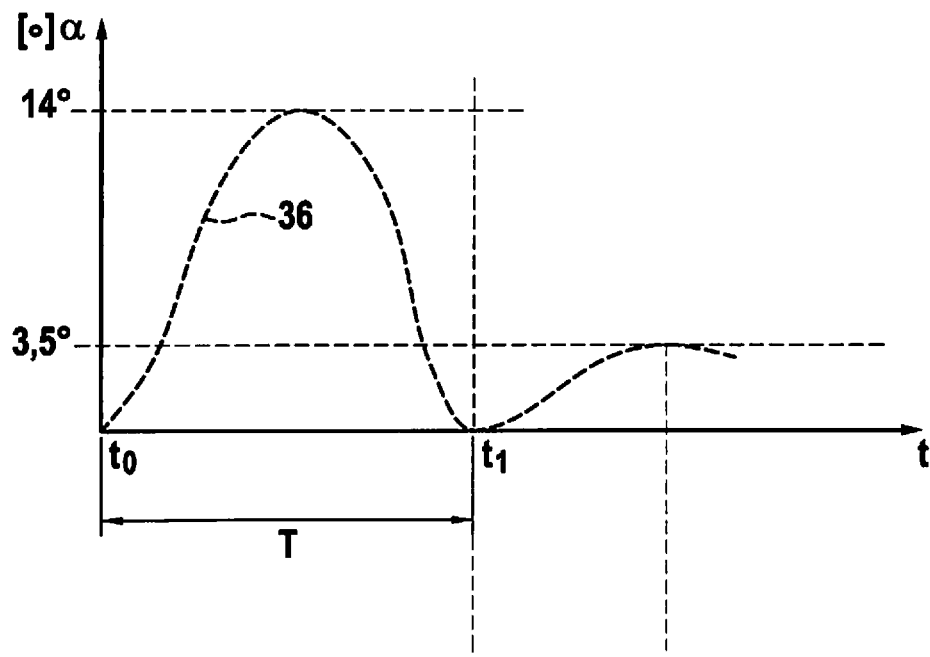
FIGS. 4A and 4B show the stiffening of the steering by reducing the steering ratio.
Figure 4B:
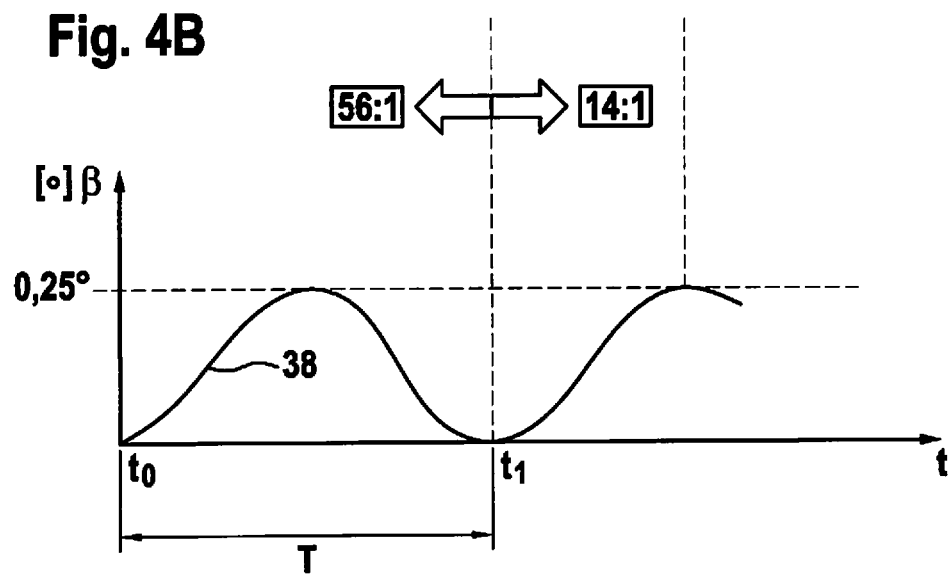

FIGS. 4A and 4B show the stiffening of the steering through the reduction of the steering ratio.

In FIG. 4A, steering wheel angle α for the steering wheel rotation over time t is shown as curve 36. In FIG. 4B, for this purpose the actual rotation of the front wheels is shown in the form of a wheel steering angle β, as curve 38. In the example shown in FIGS. 4A and 4B, the steering ratio is changed by a factor of 4 during specified time span T, and is thus 56:1. Normally, the steering ratio is 14:1. Due to the reduced steering ratio during specified time span T, a steering movement of the driver is transmitted to the front wheels only to a reduced degree. Thus, for example, given a steering wheel rotation of 16°, a wheel steering angle rotation of only 0.25°, instead of 1°, is transmitted to the front wheels of the vehicle.

The present invention is not limited to the exemplary embodiments described here or to the aspects emphasized therein. Rather, within the scope of the present invention, a large number of modifications are possible that are within the competence of those skilled in the art.

What is claimed is:

1. A method for assisting a driver of a vehicle, the vehicle including a driver assistance system that enables at least temporary autonomous driving, the method comprising:
   in a time period before the termination of a driving maneuver by the driver assistance system, requesting, via a signal, the driver to take over guidance of the vehicle; and
   stiffening steering of the vehicle for a specified time span after the request signaled to the driver to take over lateral guidance, so as to avoid an unintentional steering wheel rotation or oversteering by the driver if the driver intervenes too late in the steering;
   wherein the specified time span is selected as a function of at least one of a speed of the vehicle, a distance from an obstacle, and a distance from a lane boundary.

2. The method as recited in claim 1, wherein the stiffening of the steering takes place through at least one of: (i) reduction of a steering support within the specified time span, and (ii) application of a counter-torque that is opposed to a steering movement of the driver when the steering movement takes place within the specified time span.

3. The method as recited in claim 1, wherein, to stiffen the steering during the specified time span, a steering ratio is changed in such a way that steering wheel rotations result in reduced wheel steering angle rotations.

4. The method as recited in claim 1, wherein a strength of the stiffening is carried out as a function of the driving speed of the vehicle, the stiffening increasing as the speed of the vehicle increases.

5. The method as recited in claim 1, wherein the stiffening of the steering of the vehicle takes place as a function of the steering direction, the stiffening being stronger when steering takes place in a direction of an obstacle or a lane boundary than when steering takes place in the direction of an open surface.

6. The method as recited claim 1, wherein one of: (i) the specified time span for the stiffening of the steering begins at a time at which the driver grasps a steering wheel, or (ii) the specified time span begins at a time at which the driver begins steering.

7. A non-transitory computer readable storage medium on which is stored a computer program, which is executable by a processor, comprising:
   a program code arrangement having program code for assisting a driver of a vehicle, the vehicle including a driver assistance system that enables at least temporary autonomous driving, by performing the following:
   in a time period before the termination of a driving maneuver by the driver assistance system, requesting, via a signal, the driver to take over guidance of the vehicle; and
   stiffening steering of the vehicle for a specified time span after the request signaled to the driver to take over lateral guidance, so as to avoid an unintentional steering wheel rotation or oversteering by the driver if the driver intervenes too late in the steering;
   wherein the specified time span is selected as a function of at least one of a speed of the vehicle, a distance from an obstacle, and a distance from a lane boundary.

8. A driver assistance system, comprising:
   a control device that permits at least temporary autonomous driving of a vehicle, wherein the control device is set up to stiffen a steering of the vehicle for a specified time span, so as to avoid an unintentional steering wheel rotation or oversteering;
   wherein the control device is configured to perform the following:
   in a time period before the termination of a driving maneuver by the driver assistance system, requesting, via a signal, a driver to take over guidance of the vehicle; and
   stiffen steering of the vehicle for the specified time span after the request signaled to the driver to take over lateral guidance by the driver if the driver intervenes too late in the steering;
   wherein the specified time span is selected as a function of at least one of a speed of the vehicle, a distance from an obstacle, and a distance from a lane boundary.

* * * * *